United States Patent Office 3,020,258
Patented Feb. 6, 1962

3,020,258
ODOR INHIBITORS FOR OLEFIN POLYMERS
Archie L. Robbins, Bartlesville, Okla., assignor to Phillips Petroleum Company, a corporation of Delaware
No Drawing. Filed Aug. 31, 1959, Ser. No. 836,859
12 Claims. (Cl. 260—45.9)

This invention relates to odor inhibitors for use with olefin polymers. In one aspect, it relates to the prevention of odor development in olefin polymers prepared in the presence of a chromium oxide-containing catalyst and containing an antioxidant.

Various methods have been recently proposed for preparing high density, highly crystalline polymers of olefins, such as polyethylene, polypropylene, ethylene-propylene copolymers, and the like. These polymers have been extensively used in the fabrication of molded articles of many kinds, pipe, sheeting, film, fiber, and the like. One recently disclosed process for the manufacture of these polymers involves the polymerization of an olefin in the presence of a catalyst comprising a chromium oxide. Prior to the utilization of such polymers in the fabrication of manufactured articles, it is the usual practice to incorporate therein a minor amount, generally less than one weight percent, of an antioxidant such as a compound of the bisphenol type, certain substituted phenols, or a phenylenediamine. When operating with olefin polymers prepared with a chromium oxide-containing catalyst and containing an antioxidant, it has been found that at elevated temperatures, such as might be incurred in injection molding procedures, e.g., between about 350 and 600° F., objectionable odors may develop. This condition is most frequently observed when appreciable amounts of catalyst remain in the polymer as indicated by a high ash content. However, if no anti-oxidant is present in the polymer the odor development problem does not exist even at high ash levels.

It is an object of this invention to provide compounds for inhibiting the development of odor in hydrocarbon polymers prepared with a chromium oxide-containing catalyst and containing an odor-producing antioxidant.

Another object of the invention is to provide a method for inhibiting or substantially eliminating the development of odor in olefin polymers prepared with a chromium oxide-containing catalyst and containing an odor-producing antioxidant.

Other and further objects and advantages of the invention will become apparent to those skilled in the art upon consideration of the accompanying disclosure.

The present invention relates to odor inhibitors for use with olefin polymers and to a method for preventing odor development in olefin polymers. It has been found that odor development in antioxidant-containing olefin polymers prepared in the presence of a chromium oxide-containing catalyst can be eliminated or substantially reduced by incorporating in the polymer in the range of 0.01 to 2.0 weight percent, based on the amount of the polymer, an aminophenol. Examples of such compounds suitable for use in the practice of the invention are ortho-, meta-, and para-aminophenol. The aminophenols of this invention can be incorporated in the polymer by any suitable method. For example, they can be blended with the polymer on a roll mill, or they can be incorporated by solution blending. In another suitable method, the odor inhibitor is dissolved in a volatile solvent, such as acetone, and dry blended with the polymer prior to pelletizing.

A method for preparing olefin polymers applicable in the practice of the present invention is disclosed in U.S. Patent No. 2,825,721 by J. P. Hogan and R. L. Banks. As described in detail in this patent, unique polymers and copolymers can be produced by contacting one or more olefins with a catalyst comprising, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. The olefin feed used for the polymerization is at least one olefin, particularly an aliphatic 1-olefin, selected from a class of olefins having a maximum of 8 carbon atoms per molecule and no branching nearer the double bond than the 4-position. Examples of olefins which can be polymerized by the described method include ethylene, propylene, 1-butene, 1-pentene, and 1,3-butadiene. Copolymers, such as ethylene-propylene copolymers and ethylene-butadiene copolymers, can also be prepared by utilizing the chromium oxide-containing catalyst. In copending U.S. patent application Serial No. 590,567, filed by G. T. Leatherman and C. V. Detter on June 11, 1956, a process is described for preparing ethylene polymers which are particularly applicable for use in the practice of the present invention.

In accordance with the Leatherman and Detter process, which is described in detail in the above-cited application, ethylene or mixtures of ethylene with other unsaturated hydrocarbons are contacted with a suspension of a chromium oxide-containing catalyst in a liquid hydrocarbon diluent. The contacting occurs at a temperature such that substantially all of the polymer produced is insoluble in the diluent and in solid particle form, the particles being substantially non-tacky and non-agglutinative, and suspended in the liquid diluent. The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule, can be advantageously utilized in the practice of the invention. Examples of paraffins which can be employed include propane, n-butane, n-pentane, isopentane, n-hexane, n-decane, 2,2,4-trimethylpentane (isooctane), and the like. Another class of hydrocarbons which can be used are naphthenic hydrocarbons having from 4 to 6 carbon atoms in a napthenic ring and which can be maintained in the liquid phase under the polymerization conditions. Examples of such naphthenic hydrocarbons are cyclohexane, cyclopentane, methylcyclopentane, methylcyclohexane, ethyl cyclohexane, the methyl ethyl cyclopentanes, the methyl propyl cyclohexanes, and the ethyl propyl cyclohexanes. A preferred subclass of naphthenic hydrocarbons within the above-described general class is constituted by those naphthenic hydrocarbons having from 5 to 6 carbon atoms in a single ring and from 0 to 2 methyl groups as the only substituent on the ring. Thus, the preferred naphthenic hydrocarbons are cyclopentane, cyclohexane, methylcyclopentane, methylcyclohexane, the dimethylcyclopentanes, and the dimethylcyclohexanes. It is also disclosed by Leatherman and Detter that mixtures of paraffinic and naphthenic hydrocarbons can serve as the reaction medium.

When utilizing butane and higher paraffinic hydrocarbons as the reaction medium, the polymerization temperature of the Leatherman and Detter process is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below, preferably about 180° F. and below. If mixtures of paraffinic and naphthenic hydrocarbons are employed, the upper temperature limit will be between 190 and 230° F., depending upon the composition of the mixture.

The catalyst used in the above-described process comprises, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia, and thoria. The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred nonchromium component is a silica-alumina composite containing a major proportion of silica and a minor proportion of alumina. While the method of preparing the silica-alumina composite undoubtedly affects to some extent the catalyst activity, it appears that the composites prepared from any of the prior art processes for preparing such catalytically active composites, e.g., coprecipitation or impregnation, are operative for the process of this invention. Methods for the preparation and activation of this catalyst are described in detail in the Hogan and Banks patent referred to hereinabove. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate and ammonium chromate. The composite resulting from the impregnation step is dried and then contacted for a period of several hours at a temperature of from 450 to 1500° F., preferably from about 900 to 1000° F., under non-reducing conditions, for example, with a stream of substantially anhydrous (dew point preferably 0° F. or lower) oxygen-containing gas such as air. A commercial microspheroidal silica-alumina composite can also be advantageously used in the preparation of the catalyst.

The catalyst is preferably employed in the form of a relatively fine powder so that it may be readily maintained in suspension or as a slurry in the liquid hydrocarbon. The catalyst powder generally has a particle size of 100 mesh or smaller, preferably 100 microns or smaller. While the catalyst size is not critical, it should be small enough so that it can be readily maintained as a slurry in the liquid hydrocarbon. The concentration of the catalyst in the reaction zone can vary within wide limits. However, the concentration of the catalyst in the reaction zone will generally be in the range of 0.01 to 5 weight percent, preferably 0.01 to 0.1 weight percent, based on the total amount of the reaction medium, i.e., liquid hydrocarbon diluent, present in the reaction zone. While there are no critical residence or contact times for practicing the process, the contact time will generally be in the range of 0.1 to 12 hours, preferably from 1 to 5 hours.

One of the outstanding advantages of the Leatherman and Detter process is that it is possible to obtain very high polymer product yields in terms of pounds of polymer per pound of catalyst. As a result, the polymer product, which is in particle form, contains a relatively small amount of catalyst, and catalyst separation methods are often unnecessary in order to render the polymer suitable for many uses. However, such polymers still have a higher ash content than do those produced by a solution process which employs catalyst separation methods, e.g., filtration, to remove catalyst residues. Because of the presence of these relatively large amounts of catalyst in the polymer product produced by the Leatherman and Detter process, it has been found that there is a greater tendency for odor to develop when the polymers containing odor-producing antioxidants are worked at elevated temperatures. With this type of polymer, the odor inhibitors are generally incorporated by dry blending with the polymer as it is recovered from the process.

The polymers to which the odor inhibitors of this invention are added include an antioxidant suitable for protecting hydrocarbon polymers against degradation and containing in its structure a phenyl radical in which at least one of its valences is satisfied by either an amino or a hydroxy group. The antioxidant compounds are free of carboxyl groups and usually have a molecular weight of at least 110. These compounds are commonly known as phenols, bisphenols and aromatic amines. Examples of such odor-producing compounds include 4,4'-thiobis(6-tert-butyl-o-cresol),
Di-beta-naphthyl-p-phenylenediamine,
p,p'-Dioctyldiphenylene-diamine,
4,4'-thiobis(6-isopropyl-m-cresol),
4,4'-thiobis(3-pentadecyl-5-tert-butylphenol),
4,4'-thiobis(3-ethyl-2-hexylphenol),
4,4'-thiobis(3-methyl-6-benzylphenol),
4,4'-thiobis(3,6-diethylphenol), and the like;
4,4'-butylidene bis (6-tert-butyl-m-cresol),
4,4'-propylidene bis(5-tert-amyl-m-cresol),
4,4'-methylene bis(3,6-dimethylphenol), and the like;
2,5-di-tert-amylhydroquinone,
2,6-di-tert-butylhydroquinone,
Hydroquinone, and the like;
2,6-di-tert-butyl-5-methylphenol,
2,4,6-tri-tert-butylphenol,
2-methyl-4-ethyl-6-isopropylphenol, and the like; and
N,N'-diphenyl-p-phenylene-diamine,
N,N'-di-tert-butyl-p-phenylenediamine,
N-phenyl-N'-cyclohexyl-o-phenylene-diamine, and the like.

From the viewpoint of odor development, it is usually preferred to use as antioxidants compounds of the thiobisphenol type, e.g., 4,4' - thiobis(6 - tert - butyl - m - cresol). However, in the absence of the aminophenols of the present invention, polymers containing these preferred compounds are still subject to the odor problem if there is present in the polymer more than about 0.01 percent ash. The antioxidants are generally added in amounts between about 0.001 and 1.0 weight percent of the polymer.

A more comprehensive understanding of the invention can be obtained by referring to the following illustrative example which is not intended, however, to be unduly limitative of the invention.

*Example*

A series of tests was conducted in order to illustrate the effectiveness of the odor inhibitors of this invention in preventing odor development in a high density, highly crystalline polyethylene. The polymer used in the tests was a portion taken from a blend of polyethylenes prepared in the presence of a chromia-silica-alumina catalyst at a temperature in the range of 200 to 225° F., a pressure in the range between 300 and 450 p.s.i.g., using n-pentane as the diluent. The polyethylene used had incorporated therein 0.05 weight percent of Santonox (4,4'-thiobis(6-tert-butyl-m-cresol)) and had an ash content of 0.08 weight percent. The polyethylene in particulate form as recovered from the drier and containing antioxidant was admixed with 0.1 weight percent para-aminophenol, the latter compound being sprayed on the polymer in an acetone solution. The acetone vaporized from the mixture, leaving the odor inhibitor on the surface of the polymers. A portion of this blend was heated in an injection molding machine at 500° F. for 12 minutes after which it was injection molded into bars. Control bars were prepared in the same manner from the antioxidant-containing polymer but containing no odor inhibitor. The bars were maintained in closed containers for several hours after which they were evaluated relative to odor development by a panel of 10 individuals. The evaluation made by this panel was on a scale varying from 1 to 5, with 1 being best and 5 being poorest. The average of these ratings was recorded as the comparative odor. It is to be understood that the evaluations were qualitative and purely comparative. The results of the evaluation are shown hereinbelow.

Additive, 0.1%: Odor
  p-Aminophenol_____ 1.6
  none_____ 4.7

From the foregoing test, it is seen that the addition of the odor inhibitor of this invention resulted in odor development being substantially eliminated.

It will be apparent to those skilled in the art that variations and modifications can be made in the light of the foregoing disclosure. Such variations and modifications are believed to be clearly within the spirit and scope of the invention.

I claim:

1. A polymer composition comprising a blend of (1) a polymer of an olefin having a maximum of 8 carbon atoms per molecule and no branching nearer the double bond than the 4-position, said polymer having been prepared in the presence of a chromium oxide-containing catalyst and containing an odor-producing antioxidant compound containing in its structure a phenyl radical in which at least one of its valences is satisfied with a member selected from the group consisting of amino and hydroxy groups, said compound having a molecular weight of at least 110, and (2) in the range of 0.01 to 2.0 weight percent of an aminophenol selected from the group consisting of ortho-, meta-, and para-aminophenol.

2. A polymer composition comprising a blend of (1) a polymer of an aliphatic 1-olefin having a maximum of 8 carbon atoms per molecule and no branching nearer the double bond than the 4-position, said polymer having been prepared in the presence of a chromium oxide-containing catalyst; (2) in the range of 0.001 to 1.0 weight percent, based on the amount of said polymer, of an odor-producing antioxidant compound containing in its structure a phenyl radical in which at least one of its valences is satisfied with a member selected from the group consisting of amino and hydroxy groups, said compound having a molecular weight of at least 110; and (3) in the range of 0.01 to 2.0 weight percent, based on the amount of said polymer, of an aminophenol selected from the group consisting of ortho-, meta-, and para-aminophenol.

3. A polymer composition in accordance with claim 2 in which said antioxidant compound is 4,4'-thiobis(6-tert-butyl-m-cresol) and said aminophenol is para-aminophenol.

4. A polymer composition in accordance with claim 2 in which said antioxidant compound is 4,4'-thiobis(6-tert-butyl-m-cresol) and said aminophenol is meta-aminophenol.

5. A polymer composition in accordance with claim 2 in which said antioxidant compound is 4,4'-thiobis(6-tert-butyl-m-cresol) and said aminophenol is ortho-aminophenol.

6. A polymer composition in accordance with claim 2 in which said 1-olefin is ethylene.

7. A method for inhibiting the development of odor in olefin polymers which comprises blending with a polymer of an olefin having a maximum of 8 carbon atoms per molecule and no branching nearer the double bond than the 4-position, said polymer having been prepared in the presence of a chromium oxide-containing catalyst and containing an odor-producing antioxidant compound containing in its structure a phenyl radical in which at least one of its valences is satisfied with a member selected from the group consisting of amino and hydroxy groups, said compound having a molecular weight of at least 110, in the range of 0.01 to 2.0 weight percent, based on the amount of said polymer, of an aminophenol selected from the group consisting of ortho-, meta-, and para-aminophenol.

8. A method for inhibiting the development of odor in olefin polymers which comprises blending with a polymer of an aliphatic 1-olefin having a maximum of 8 carbon atoms per molecule and no branching nearer the double bond than the 4-position, said polymer having been prepared in the presence of a chromium oxide-containing catalyst, the following materials: (1) in the range of 0.001 to 1 weight percent, based on the amount of said polymer, of an odor-producing antioxidant compound containing in its structure a phenyl radical in which at least one of its valences is satisfied with a member selected from the group consisting of amino and hydroxy groups, said compound having a molecular weight of at least 110, and (2) in the range of 0.01 to 2.0 weight percent, based on the amount of said polymer, of an aminophenol selected from the group consisting of ortho-, meta-, and para-aminophenol.

9. The method in accordance with claim 8 in which said antioxidant compound is 4,4'-thiobis(6-tert-butyl-m-cresol) and said aminophenol is para-aminophenol.

10. The method in accordance with claim 8 in which said antioxidant compound is 4,4'-thiobis(6-tert-butyl-m-cresol) and said aminophenol is meta-aminophenol.

11. The method in accordance with claim 8 in which said antioxidant compound is 4.4'-thiobis(6-tert-butyl-m-cresol) and said aminophenol is ortho-aminophenol.

12. The method in accordance with claim 8 in which said 1-olefin is ethylene.

References Cited in the file of this patent

UNITED STATES PATENTS

| | | |
|---|---|---|
| 2,730,500 | Young et al. | Jan. 10, 1956 |
| 2,820,775 | Chamberlain et al. | Jan. 21, 1958 |
| 2,825,721 | Hogan et al. | Mar. 4, 1958 |
| 2,833,636 | Gleam | May 6, 1958 |

FOREIGN PATENTS

| | | |
|---|---|---|
| 520,923 | Canada | Jan. 17, 1956 |
| 772,938 | Great Britain | Apr. 17, 1957 |
| 796,285 | Great Britain | June 11, 1958 |